(12) United States Patent
Liu et al.

(10) Patent No.: US 10,895,461 B2
(45) Date of Patent: Jan. 19, 2021

(54) MULTI-DAY, MULTI-PERSON, AND MULTI-MODAL TRIP PLANNING SYSTEM

(71) Applicant: Ford Global Technologies, LLC, Dearborn, MI (US)

(72) Inventors: Yimin Liu, Ann Arbor, MI (US); Tina Yang, Ypsilanti, MI (US); Hao Liu, Dearborn, MI (US); Fei Wang, Ann Arbor, MI (US); Rebecca Peng, Shanghai (CN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 197 days.

(21) Appl. No.: 16/085,413

(22) PCT Filed: Mar. 15, 2016

(86) PCT No.: PCT/US2016/022427
§ 371 (c)(1),
(2) Date: Sep. 14, 2018

(87) PCT Pub. No.: WO2017/160276
PCT Pub. Date: Sep. 21, 2017

(65) Prior Publication Data
US 2019/0056233 A1 Feb. 21, 2019

(51) Int. Cl.
*G01C 21/34* (2006.01)

(52) U.S. Cl.
CPC ....... *G01C 21/3423* (2013.01); *G01C 21/343* (2013.01); *G01C 21/3484* (2013.01)

(58) Field of Classification Search
CPC .. G01C 21/34; G01C 21/3423; G01C 21/343; G01C 21/3484

(Continued)

(56) References Cited

U.S. PATENT DOCUMENTS

| 5,948,040 A | 9/1999 | DeLorme et al. |
| RE38,724 E * | 4/2005 | Peterson ............ G01C 21/3461 340/905 |

(Continued)

FOREIGN PATENT DOCUMENTS

CN 103678489 3/2014

OTHER PUBLICATIONS

Tom Schouwenaars et al., Mixed Integer Programming for Multi-Vehicle Path Planning, ECC2001 Conference, pp. 2603-2608.

*Primary Examiner* — Atul Trivedi
(74) *Attorney, Agent, or Firm* — Brandon Hicks; MacMillan, Sobanski & Todd, LLC

(57) ABSTRACT

A multi-day and multi-person trip planning system comprises a planning graph of nodes interconnected by transit arcs which both have associated time-variable costs and time. A user specifies user objectives within trip destinations and customizes a plurality of user preferences for a multi-day, multi-person, multi-modal trip. An optimizer compiles a plurality of permutations of visiting plans within the planning graph which satisfy the specified user objectives including routing to a plurality of trip destinations. The optimizer compares the permutations using mixed integer programming or constraint programming to identify at least one optimized visiting plan having a lowest aggregate associated cost or shortest travel time that also satisfies a plurality of constraints determined by the customizable user preferences or environment condition. Then the user interface presents at least one optimized visiting plan to a user or route related coupons.

23 Claims, 4 Drawing Sheets

(58) Field of Classification Search
USPC .......................................................... 701/425
See application file for complete search history.

(56) References Cited

U.S. PATENT DOCUMENTS

| | | | | |
|---|---|---|---|---|
| 8,190,362 B2* | 5/2012 | Barker | ................ | G08G 1/0962 |
| | | | | 701/414 |
| 8,949,028 B1* | 2/2015 | Klampfl | ............. | G01C 21/3423 |
| | | | | 701/538 |
| 10,480,947 B2* | 11/2019 | Lalonde | ............ | G01C 21/206 |
| 2005/0216301 A1 | 9/2005 | Brown | | |
| 2006/0241855 A1* | 10/2006 | Joe | ........................ | G01C 21/34 |
| | | | | 701/533 |
| 2006/0241856 A1* | 10/2006 | Cobleigh | ............... | G06T 17/05 |
| | | | | 701/533 |
| 2007/0185744 A1 | 8/2007 | Robertson | | |
| 2007/0208492 A1* | 9/2007 | Downs | ................ | G08G 1/0104 |
| | | | | 701/117 |
| 2008/0046134 A1* | 2/2008 | Bruce | ................. | G06Q 10/047 |
| | | | | 701/1 |
| 2008/0071465 A1* | 3/2008 | Chapman | ........... | G01C 21/3691 |
| | | | | 701/117 |
| 2010/0023190 A1 | 1/2010 | Kumar et al. | | |
| 2010/0036606 A1* | 2/2010 | Jones | .................. | G06Q 10/047 |
| | | | | 701/533 |
| 2010/0305984 A1 | 12/2010 | Ben-Yitschak et al. | | |
| 2011/0138050 A1 | 6/2011 | Dawson et al. | | |
| 2012/0016678 A1* | 1/2012 | Gruber | .................. | B60K 35/00 |
| | | | | 704/275 |
| 2012/0158285 A1* | 6/2012 | Yamazaki | .......... | G01C 21/3492 |
| | | | | 701/410 |
| 2012/0185793 A1* | 7/2012 | Binsztok | ............... | G06Q 10/02 |
| | | | | 715/772 |
| 2012/0253551 A1 | 10/2012 | Halimi et al. | | |
| 2013/0046456 A1* | 2/2013 | Scofield | ............ | G01C 21/3453 |
| | | | | 701/117 |
| 2013/0179067 A1* | 7/2013 | Trowbridge | ........... | G01C 21/34 |
| | | | | 701/410 |
| 2014/0200807 A1* | 7/2014 | Geisberger | ......... | G01C 21/3415 |
| | | | | 701/533 |
| 2014/0236647 A1 | 8/2014 | Wettan | | |
| 2015/0106311 A1* | 4/2015 | Birdwell | .................. | G06N 3/10 |
| | | | | 706/20 |
| 2015/0235478 A1* | 8/2015 | Blandin | ............. | G06Q 30/0206 |
| | | | | 705/7.35 |
| 2015/0330800 A1* | 11/2015 | Huyi | .................... | G01C 21/343 |
| | | | | 701/425 |
| 2016/0202079 A1* | 7/2016 | Konig | ............. | G08G 1/096833 |
| | | | | 701/533 |
| 2019/0346572 A1* | 11/2019 | Fowe | ...................... | G01S 19/26 |
| 2019/0385121 A1* | 12/2019 | Waliany | ........... | G06Q 10/08355 |
| 2020/0041291 A1* | 2/2020 | Dunnette | ........... | G01C 21/3423 |
| 2020/0103242 A1* | 4/2020 | Chachra | ............. | G06Q 50/30 |
| 2020/0124429 A1* | 4/2020 | Zhang | ............ | G01C 21/3453 |
| 2020/0158526 A1* | 5/2020 | McKenna | .............. | G06Q 50/30 |

* cited by examiner

MULTI-DAY, MULTI-PERSON, AND MULTI-MODAL TRIP PLANNING SYSTEM

BACKGROUND OF THE INVENTION

The present invention relates in general to a personalized trip planner for visiting desired locations (e.g., attractions, businesses, or other places of interest) and/or lodging in a city, and, more specifically, to optimizing a visiting plan based on various user objectives and user preferences potentially spanning a number of days and locations.

Electronic and computer-based trip planning and navigation systems have become common. Some systems include components that may be vehicle-installed or are otherwise portable. The systems may offer a point of interest (POI) search as an easy and quick way of searching for well-known destination points. POIs can include hotels, restaurants, amusements parks, coffee shops, and the like. When a POI is selected, the POI can be set as a final destination or a "waypoint," i.e., an intermediary point along a route being followed. However, routes and POIs are typically constructed by a user on an ad hoc basis with little assistance in planning of extensive trip agendas and no help in optimizing various aspects of a trip such as the best time to travel or to visit the POIs.

Trip planning has been expanded to take into account multiple modes of transportation, as shown in U.S. Pat. No. 8,949,028, issued Feb. 3, 2015, entitled "Multi-Modal Route Planning," which is incorporated herein by reference. Given a specified starting point, and a specified destination, or end point, a variety of possible routes and/or modes of transport may be possible between the starting point and the endpoint. For example, in an urban area, one or more of walking, various modes of public transportation such as buses, light rail, etc., bicycling, using a motor scooter, driving a vehicle such as a car, etc., car sharing or other ride sharing, may be used to travel from a starting point to a destination point. A route that incorporates more than one such mode of transport, e.g., having different segments that are traversed using different respective modes of transport, is sometimes referred to as a multi-modal route. Various costs are associated with various portions of a route between a starting point and an end point, including monetary and non-monetary costs such as travel time, fuel expense, pollution emissions, parking expense, waiting time for connections, etc. Some or all of these costs may be at least in part dependent upon a mode of transport used for a route portion. U.S. Pat. No. 8,949,028 discloses mechanisms for taking into account the mode of transport and other factors in optimizing a route between a specified starting point and a specified destination point. However, optimization of an overall plan for visiting various destinations has been lacking, especially where a trip is desired spanning more than one day and/or visiting multiple destinations including both attractions and accommodations with consideration of different factors, such as weather, air quality, and destination visiting hours.

Rapid urbanization is creating a myriad of transportation challenges in cities around the globe. Many tourists and travelers go to unfamiliar places for multi-day trips. To meet the growing demand for mobility while simultaneously managing congestion, energy consumption, and negative environmental impacts, a variety of different practices and business development have been employed. These include limiting the number of licenses or levying vehicle taxes, congestion pricing, and license plate rationing, as well as enhancing public transportation systems. But even with these measures, traffic congestion and crowding are expected to continue to increase in the future. Thus, people need a way to select and optimize their mobility options.

As more and more people travel in urbanized areas, it is important to enable personal mobility functions that allow tourists to plan a multi-day trip or for family/friends to plan a multi-person trips together. A system is needed that provides alternatives on how people can get from their origin to several destinations based on their individual preferences (fastest time, avoiding traffic, only using a car, etc) and other conditions (e.g., weather or air quality). Only subsets of the necessary functionality have yet been available. No integrated approach has yet existed to provide multi-day routing options for multi-modal mobility that further incorporates personalized/customized information and optimizes a trip for various constraints.

SUMMARY OF THE INVENTION

The invention provides seamless mobility for multi-day and/or multi-person routing options. Users can conduct trip planning based on current transportation options by integrating a plurality of mobility modes and services such as vehicle-sharing (e.g., car-pooling), personal transport (e.g., private cars), public transportation systems (e.g., trains, buses, subways), travel costs, travel times, travel conformability, parking, restrooms, gas stations, weather conditions, air quality, accidents, as well as other personalized and customizable information to provide routes and mobility options for users to get not just from point A to point B but also to plan visits to attractions and accommodations. As used herein, "attractions" refers to any desired destinations including, but not limited to, recreational or cultural sites for tourists and business sites (e.g., commercial, medical, educational, or governmental) for business users (e.g., salespersons) or for any other users.

A first example of a use case of the invention is optimal planning of a multi-day trip for out-of-town visitors. When tourists come to a new city, they usually want to find a place to stay first. Based on the attractions to be visited and users' budget, the invention will optimize the location for users to stay and the travel routes using personal preferences and real-time data such as traffic data. The system can recommend both routes and appropriate indoor and outdoor activities based on weather and air quality conditions.

A second use case example is optimal trip for car-pooling (or a multi-person trip traveling separately) to a recreational activity for friends. Each of the users may independently use the system to obtain the route/mode of transport and arrange a meeting at the same destination.

A third use case example is similar to the first case except that family or friends from out-of-town may stay with family or friends during the trip (i.e., the place to stay is fixed in advance). The system can be used to plan individual (e.g., one-day) trips during their stay which can be optimized for time of visit to an attraction (e.g., when the attraction is less crowded or when travel times are best).

When the trip actually begins and the users are engaged in the various modes of transportation, a mobile device (e.g., smartphone) or a device mounted in a vehicle (e.g., car) can be used to link to the optimal planning system to assist in the execution of the trip. For example, if the plan involves picking up some friends along the routes, a human machine interface (HMI) on the device tells the user the optimal pickup location and sends a notification to the friends to let them know when and where the vehicle will arrive. The HMI could display parking lots available near the destinations and how many park spots are available. The system could also communicate with the attractions, hotels, or restaurants when the users are approaching, which will help the attractions manage the volume of visitors.

In one aspect of the invention, a multi-modal trip planning system comprises a planning graph representing a plurality of nodes interconnected by a plurality of transit arcs. The nodes include waypoints and trip destinations, the transit arcs include alternate transportation modes, and the nodes and arcs have associated time-variable costs. A user interface is configured to specify a plurality of user objectives within the trip destinations and to customize a plurality of user preferences for a multi-modal trip. An optimizer is coupled to the planning graph and the user interface configured to modify the planning graph according to the user objectives and the customized user preferences. The optimizer compiles a plurality of permutations of visiting plans within the modified planning graph which satisfy the specified user objectives including routing to a plurality of trip destinations. The optimizer compares the permutations using mixed integer programming or constraint programming to identify at least one optimized visiting plan having a lowest aggregate associated cost (e.g., shortest travel time) that also satisfies a plurality of constraints determined by the customizable user preferences. Then the user interface presents at least one optimized visiting plan to a user.

DETAILED DESCRIPTION OF PREFERRED EMBODIMENTS

Figure 1:
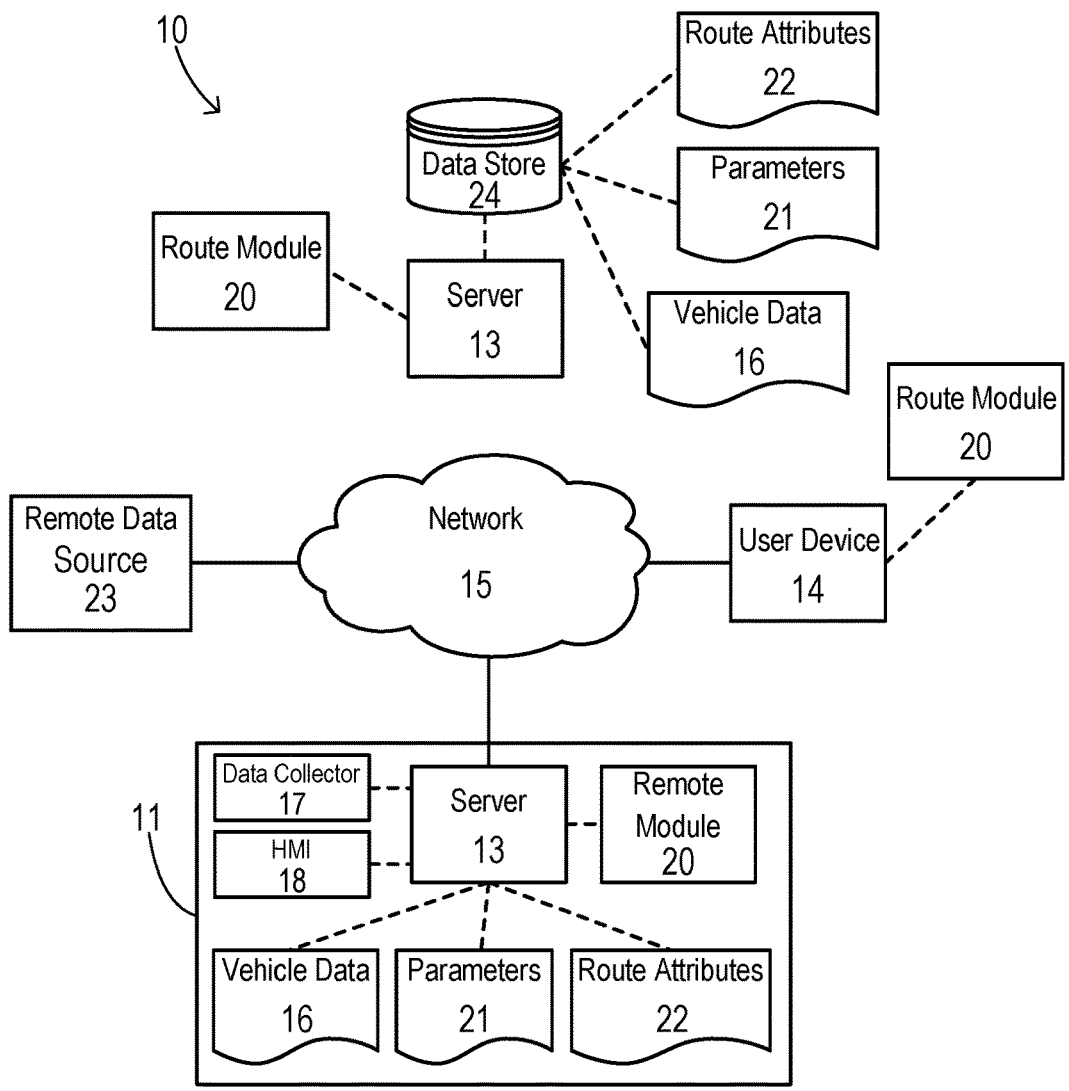
FIG. 1 is a block diagram for a multi-modal planning system.

The invention provides an integrated approach for providing a personalized trip planner for travelers for multiple days and stops, e.g., to get from point A to B and then from B to C and then from C to D, and then D back to A. It satisfies their preferences and uses their personal information and route environment (e.g., weather, traffic, number of companions, monetary budget, or government regulations) to plan a trip. The main components of the invention include accommodation location optimization, multi-day routing optimization, personalized information, customization/user preferences, route environment, cloud computing, and a user interface (e.g., a mobile app for a smartphone or an in-vehicle interface.

For multi-day and/or multi-person trip optimization, a corresponding planning graph is used to represent an existing public transportation network (optionally with car-sharing or car-pooling routes). The planning graph captures various service attributes such as availability, wait times, travel times, transfer times, number of passengers in the specific public transportation, and fares. The graph can be constructed using data from public resources and from private connections with service providers or governmental authorities, for example. Historical data is maintained to calculate average travel times over various legs within the network, travel time associated with specific time periods, and other time-variable costs associated with the nodes and transit arcs in the planning graph. Real-time data and historical data are used to forecast travel time (including traffic or weather information which may be obtained from other providers such as weather forecasting) and other attributes (i.e., costs) for using respective parts of the planning graph.

To consider integrated transit and vehicle-sharing services, the transit graph may include nodes and arcs corresponding to such vehicle-sharing options. For tractability, a trip from one vehicle-sharing station to another is represented with a single arc that represents the "optimal" route between the arc's end nodes. Optimal routes are obtained by evaluating all possible nodes during the multi-days. For street routing, an open-source map such as the one provided by OpenStreetMap.org can be used to model the road network. Other transportation modes are included using other existing sources to represent parallel arcs between respective nodes.

With the multi-modal transportation graph, the invention solves for the shortest paths between public transit nodes using different cost metrics, such as travel time, number of transfers, walking distance, reliability, comfortability, travel expense, or using a combination of the cost metrics. Because a planning graph under consideration could be large, irrelevant nodes and arcs are removed to reduce the problem size and/or pre-process some intermediate information, such as candidate transfer points, to further improve computational time. Both user objectives (e.g., travel dates, starting and ending locations of trip, and desired attractions) and user preferences (e.g., transit modes, air quality index, type of accommodations, and travel services) can be used in generating a modified planning graph.

User preferences can include personalized information identified by the system based on past behaviors (or trips). For a new user, the preferences may be initialized with default values. With use, the default values are overwritten with newly learned preferences, or the user may customize various preferences via a user interface. User preferences may apply for all trip planning performed by the user or can be customized for one particular trip being planned. When planning a particular trip, the user specifies one or more trip objectives via the user interface. The specified user objectives may include the number of travel companions, budget constraints, how many attractions they would like to visit, specific attractions or types of attractions to visit, or traveling style (relaxed or tight) that are desired. Users may also specify if they have any transit passes (unlimited bus and/or subway rides, discounted student/senior passes, etc.) or attraction passes.

The user objectives and/or user preferences can either increase or decrease the weighting (i.e., costs) for certain nodes or arcs or may force certain choices within a specific trip. For example, the user could specify the type of transport they are willing to take (e.g., subway only, or subway and shared vehicles), what attractions they would like to visit, waypoints along the route (i.e., locations of friends to be picked up), their optimization preferences (e g, minimize time, number of days, or some combination of preferences), how far they are willing to walk or bike, or if they will not drive if the weather is bad. Alternatively, when a user does not specify a preference, the invention can automatically make suggestions based on other users who have similar profiles.

Given the personalized information, user preferences, and trip objectives, the invention modifies the planning graph by removing nodes and arcs representing transportation services for which the user is not willing to take and/or changing the costs for associated arcs (e.g., a transfer penalty, wait time cost, travel time cost, parking costs) to reflect the user's preferences.

The invention can be implemented in a web-interface to allow the user to access a personalized trip planner on the go with a wireless mobile device (e.g., smartphone, in-vehicle navigation system, or laptop). A mobile app (such as a smartphone app) can access a user's current location, allow them to interactively enter preferences/objectives, store previous preferences or routes, store standard information (e.g., a home location), link to other websites, access car-sharing locations, and interface with cloud computing solution for performing computationally intensive procedures to optimize a trip plan. The information could be displayed on an in-vehicle interface including the number of visitors currently visiting identified attractions, parking availability, route, traffic, weather, air quality, and the locations of friends.

Cloud computing may preferably be used for providing a controller network with the software necessary to perform the computationally intensive algorithms and to store and access public and private databases (e.g., public transportation traffic data) as needed to maintain the planning graph. The cloud could also be accessed by the mobile device to re-optimize a trip in the event that one leg of the trip could not be completed.

Optimization for trip plan may preferably include the hotel location, daily routes, and departure and arrival times which are determined subject to various constraints such as budget, total trip cost, weather conditions, visiting time and waiting time for each attraction, and starting and ending time for each day. Optimization is a very challenging problem since the hotel location and routes are discrete choices while daily schedules are continuous choices. The invention uses mixed integer programming as will be described in more detail below.

One embodiment of the invention is implemented within the context of a multi-modal route planning system 10 as shown in FIG. 1. A vehicle 11 (such as a motorcycle, motorized bicycle or scooter, automobile, light truck, medium or heavy-duty truck, aircraft, or watercraft) includes a vehicle computing device 12. Computing device 12 may include or be communicatively coupled with one or more computing devices or controllers included in vehicle 11 for monitoring and/or controlling various vehicle components, such as an engine control unit (ECU) or a transmission control unit (TCU).

Computing device 12 is generally configured for communications on a controller area network (CAN) bus or the like. In addition, computing device 12 is configured for wireless communication with a remote server 13 via a communication network 15. It may also communicate with one or more mobile user devices 14 via network 15. Various wired and/or wireless networking technologies (e.g., cellular, Bluetooth, wired and/or wireless packet networks) can be included in network 15. Computing device 12 may receive and/or store vehicle data 16, e.g., from one or more data collectors 17 and/or a human machine interface (HMI) 18, such as an interactive voice response (IVR) system, a graphical user interface (GUI) including a touchscreen or the like to receive user input relating to a route or selecting a route. Computing device 12 may also provide outputs to HMI 18, e.g., to display a route or routes or to provide real-time guidance instructions.

A routing module 20 (or respective portions thereof) is generally included in the programmed instructions stored in and executed by vehicle computing device 12, mobile device 14, and/or remote server 13. Using data received in devices 12, 13, and 14 (e.g., trip parameters 21 and route attributes 22 obtained from HMI 18 and data collector 17), routing module 20 may generate one or more routes and/or potential routes for a user, e.g., multi-modal routes that may include vehicle 11 and/or other modes of transport.

Data collectors 17 may include a variety of devices. For example, various controllers in a vehicle may operate as data collectors 17 to provide data 16 via the CAN bus relating to vehicle speed, acceleration, state of charge, fuel economy, or a vehicle identification number (VIN). Modules or sensors on vehicle 11 can communicate with other off-board systems to provide or collect other data 16. For example, a global positioning system (GPS) may provide vehicle location to obtain weather, temperature, or air quality data. The location can be used to identify route conditions such as traffic, parking availability, availability of specific lanes, etc., to computing device 12, e.g., via a wired or wireless connection.

Parameters 21 may include user preferences for route generation and/or selection, such as choose fastest, choose most economical, relative weighting factors to be given to optimizing variables (e.g., fuel costs, time of travel, weather conditions, parking availability, etc.). User data 16 and/or parameters 21 can include data collected from HMI 18 or another HMI on the user's mobile device 14 or another networked device.

A remote data source 23 represents the collection of real-time information relating to the variable conditions associated with potential routes, transportation infrastructure and congestion, weather, availability of accommodations, and other factors. Data may be collected in General Transit Feed Specification (GTFS) format, such as may be obtained from various sources via the Internet specifying schedules and other attributes of one or more public transit systems relevant to a geographic area of a planned route. Collected data can include historical and/or real-time (or near real-time) traffic and other types of data, which is stored via server 13 in a data store 24. Data store 24 prepares all the necessary inputs to be used in an optimization algorithm. Data store 24 may also receive vehicle data 16 and parameters 21 from computing device 12 in connection with the process of route generation under control of server 13, for example.

Once a route or trip has been generated and selected by a user (e.g., travel times, directions, places to stay, schedule for visiting attractions, budget), the resulting route attributes 22 are stored. Attributes 22 may describe waypoints between different travel segments, opportunities for using service facilities, and other helpful data. As discussed further below, waypoints and destinations may be represented as "nodes" and segments may be represented as "transit arcs" in a planning graph. Exemplary waypoints/destinations include transit stations (e.g., bus, light rail, etc.) refueling stations, restaurants, accommodations (e.g., hotels, campgrounds), and tourist attractions. Route segments include road segments, light rail and/or bus segments (e.g., from one bus stop to another, from one rail stop to another, from a bus stop to a rail stop, etc.), and pedestrian segments.

Server 13 may comprise a controller network with a large computational and data storage capacity which may generally be represented as a cloud. Communication network 15 represents one or more mechanisms by which the user's mobile device 14 or in-vehicle computing device 12 may communicate with server/cloud 13. Accordingly, network 15 may be comprised of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN), and/or wide area networks (WAN), including the Internet, providing data communication services. User mobile device 14 may be comprised of any one of a variety of computing devices including a processor and a memory, as well as communication capabilities. For example, user device 14 may be a portable computer, tablet computer, or a smart phone that includes capabilities for wireless communications using IEEE 802.11, Bluetooth, and/or cellular communications protocols.

Figure 2:
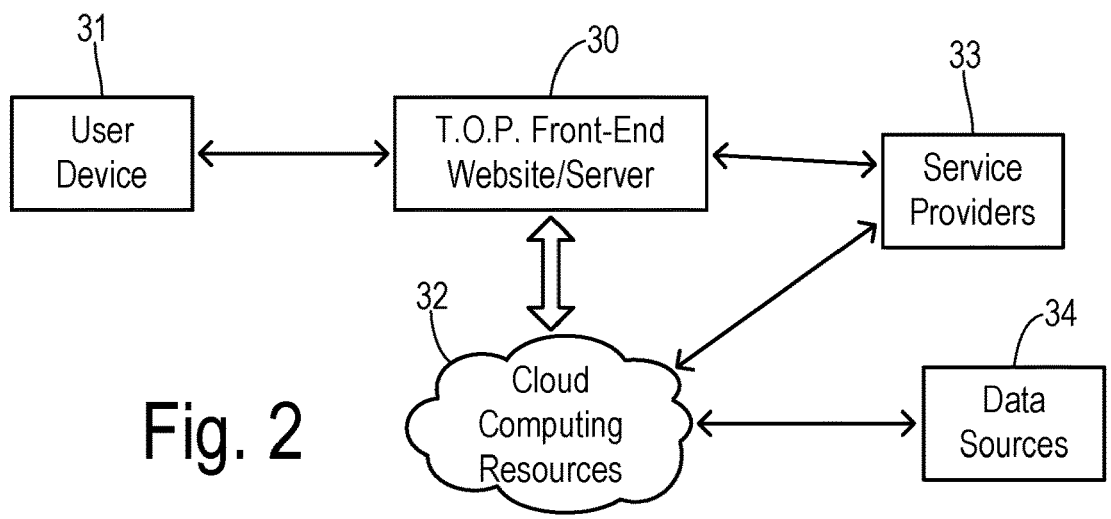
FIG. 2 is a block diagram of a general architecture for the trip optimal planning system.

In the embodiment of FIG. 2, the invention provides a trip optimal planning (TOP) service using a front-end website or server 30 accessible via a network connection from a user device 31. Website/server 30 interacts with cloud computing resources 32 in a configuration that performs multi-modal trip planning. In order to include various services and destinations/attractions in the trips/visits to be planned, website/server 30 and cloud resources 32 communicate with electronic data systems of service providers 33. In order to maintain current conditions and estimates of future conditions affecting travel routing and service accessibility, a suite of public and private data sources 34 are coupled with computing cloud computing resources 32. A user such as a tourist for a multi-day trip or an individual planning a family trip or a meeting with friends operates user device 31 to access website/server 30 via a web browser or via a mobile application. In order to provide a robust and accurate planning function, cloud computing resources 32 continually interact with data sources 34 and service providers 33 in order to establish a primary planning graph taking into account the availability and usage levels (i.e., congestion) of various transportation modes, routes, and available support services such as refueling, parking, restrooms, food, and others. By interacting with websites/server 30, the user is able to customize various user preferences such as preferred modes of transportation and times of travel (which could be designated for general use in current and future planning activities or for planning a particular trip). For a particular trip request, the user further specifies trip objectives such as number of companions, monetary budget, attractions or types of attractions or places to visit, and traveling dates. Based on the objectives and preferences provided, the TOP system uses appropriate algorithms to find the most convenient location to stay, recommended routes, transportation modes, and times of indoor or outdoor activities or attractions during the trip based on certain constraints, such as weather conditions, a date range for a trip, visiting hours, and starting and ending locations.

Figure 3:
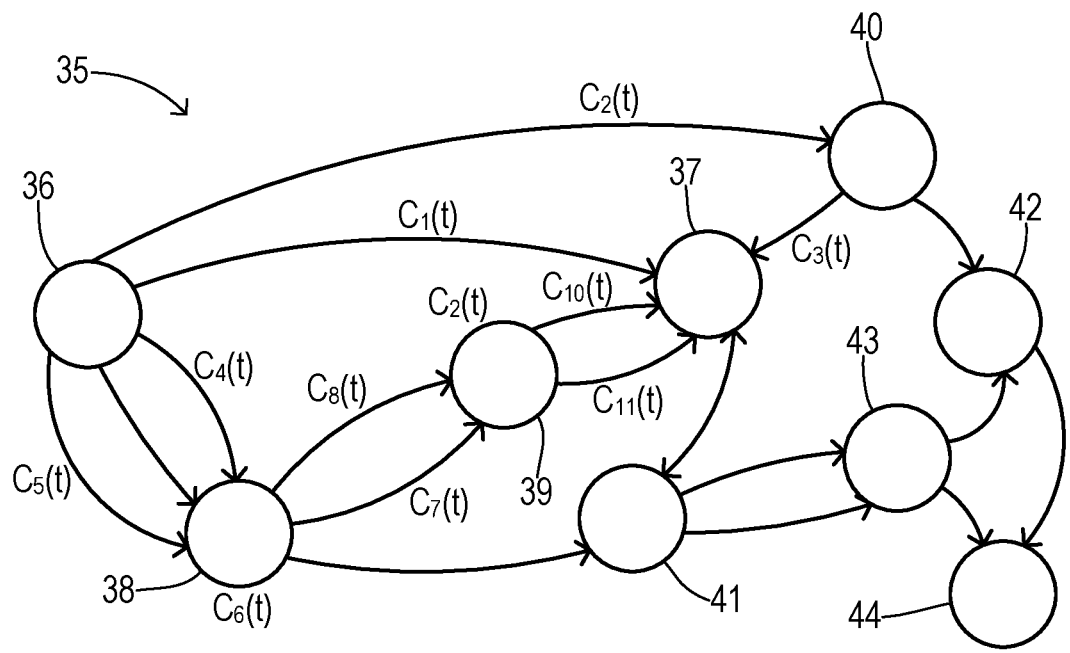
FIG. 3 depicts nodes and arcs of a planning graph.

FIG. 3 represents a simplified version of a small portion of a primary planning graph 35. Planning graph 35 takes the form of a relational database within cloud computing resources 32, for example. A plurality of nodes representing potential destinations and/or waypoints for a trip include nodes 36-44. The nodes are joined by various transit arcs each representing a respective transit mode such as motor vehicle roadway, subway, railway, or pedestrian walkway, for example. Each arc and node may further include a corresponding associated time-variable cost. As used herein, an associated time-variable cost refers to a relative weighting factor for optimizing (i.e., comparing) different trip plans which may include but is not limited to monetary costs.

An arc between nodes 36 and 37 has an associated cost $C_1(t)$. Every arc has an associated time-variable cost since each one at least has a corresponding travel time. Most nodes would have an associated cost (such as associated cost $C_6(t)$ for node 38 and associated cost $C_9(t)$ for node 39) representing costs like parking fees or wait time or traffic (passenger volume) for public transportation, but some nodes may not include any cost. Typically, each cost varies with time so that future values must be tabulated or estimated based on historic data for storing in graph 35. Many costs may vary according to the time of day or the day of week since the usage of transit arcs reflect patterns of human working/leisure activities.

Although nodes and arcs are tagged in FIG. 3 with one associated cost function, each node or arc typically includes several associated time-variable costs for different parameters such as travel time, fuel cost, travel expenses (e.g., toll fees), and any other such parameters to be used for optimizing a trip.

Figure 4:
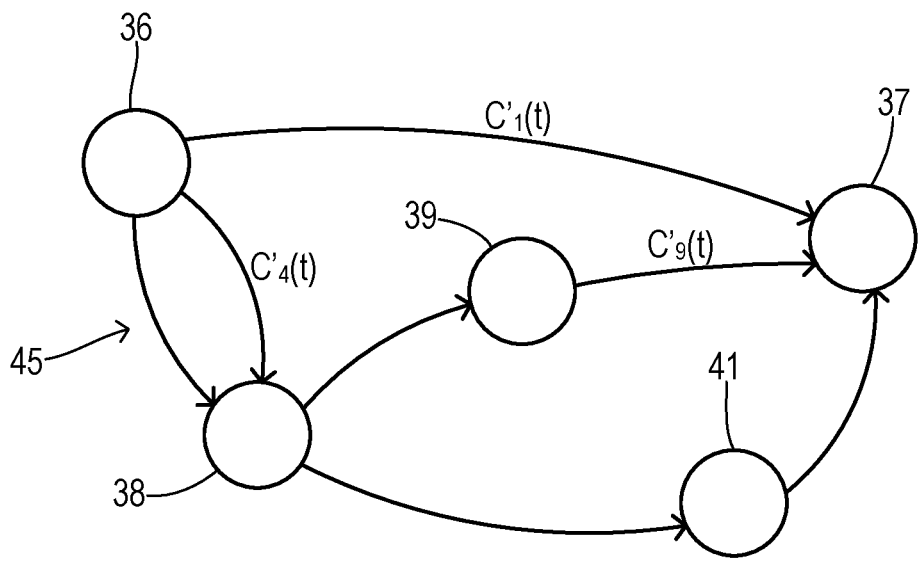
FIG. 4 depicts a modified planning graph to reduce computation for optimizing a planning request of a user.

The primary planning graph may be continuously updated and expanded as needed for providing trip planning services to a particular region, for example. Optimizing a trip within such a large database, however, requires impractical levels of computing resources. In order to reduce computational load, an individual trip may be optimized by using a subset of the primary planning graph. By way of example, after a user initiates a trip planning request identifying nodes 36 and 37 as desired starting and ending locations, a modified planning graph 45 as shown in FIG. 4 is generated by culling (i.e., removing) irrelevant nodes and arcs from primary planning graph 35. In this example, it has been determined that only nodes 36, 37, 38, 39, and 41 are relevant to a potential trip plan. Therefore, nodes 40 and 42-44 have been culled. Moreover, the trip objectives or user preferences may eliminate certain modes of transportation for certain legs of the route so that fewer than all the transit arcs between the remaining nodes are included. In addition, user preferences may also result in adjustment or modification of certain ones of the cost functions. For example, a preference for or against a particular transportation mode may result in upward toward downward adjustment of a cost $C_1(t)$ between nodes 36 and 37.

Figure 5:
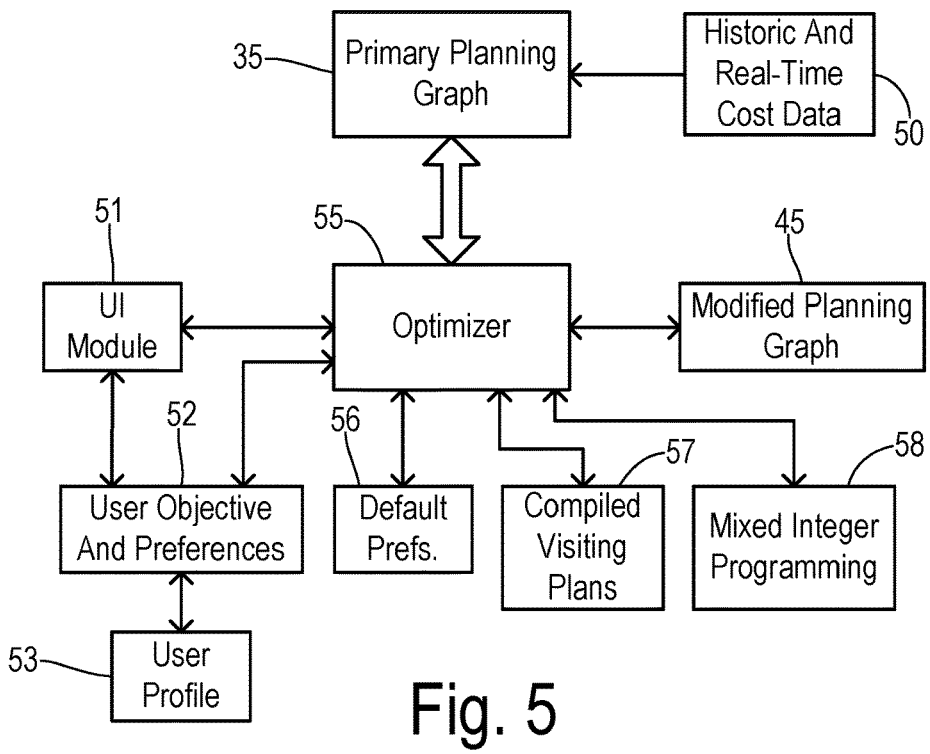
FIG. 5 is a block diagram of basic functions for one preferred embodiment of a trip optimal planning system.

An implementation of the main functions of the trip optimal planner according to a preferred embodiment are shown in FIG. 5. Primary planning graph 35 is updated over the cloud using historic and real-time cost data 50. A user interface module 51 interacts with a user in order to allow the user to specify a plurality of user objectives within the trip destinations and to customize a plurality of user preferences for a multi-modal and multi-day trip, and the objectives/preferences are stored in block 52. Customized user preferences and a history of user activity (e.g., previous trip objectives and results) may be stored in a user profile 53. Trip planning operation is centrally controlled by an optimizer block 55 coupled to user interface module 51 and to trip objectives and preferences 52. In the event that a user does not customize certain preferences, then default preferences 56 may be utilized by optimizer 55 for planning/evaluating a trip. Based on these objectives and customized or default user preferences, optimizer 55 responds to a trip planning request by modifying planning graph 35 to generate modified planning graph 45. Then optimizer 55 compiles a plurality of permutations of visiting plans which are stored in block 57, wherein each permutation satisfies the specified user objectives including routing between a plurality of trip destinations/waypoints available within modified planning graph 45.

In order to compare the permutations of the visiting plans to identify at least one optimized visiting plan, optimizer 55 may use a mixed integer programming block 58. The mixed integer programming finds one or more permutations with a lowest aggregate associated cost from among all the permutations of visiting plans, with the further requirement that each identified visiting plan also satisfies a plurality of constraints which are determined by the customizable user preferences. After one or more visiting plans are identified, they are transferred from optimizer 55 to user interface module 51 to be presented to the user for either selection of one plan among a plurality of plans and/or for execution of a selected plan. In another embodiment, optimizer 55 may use constraint programming.

The comparison of the permutations using mixed integer programming and identifying of visiting plans with a lowest aggregate associated cost which also satisfy a plurality of user preference constraints is conducted as follows.

The objective is to optimize the trip plan including hotel location, daily routes, and daily schedules subject to various constraints such as total trip cost (of which monetary expense may be one element), expected weather conditions, maximum visiting time and staying time for each attraction, and range of starting and ending time for each day, the number of attractions or places to visit, and the days to stay. This is a challenging problem since hotel location and routes are discrete choices while daily schedules are continuous choices. In order to use mixed integer programming, the following variables are defined:

the location list is $h=\{h_1, h_2, \ldots, h_J\}$,
the visiting dates are $t=\{t_0+1, t_0+2, \ldots, t_1+D\}$,
the daily number of places visited are $n=\{n_{t_0+1}, n_{t_0+2}, \ldots, n_{t_0+D}\}$,
the visiting routes are $v=\{v_{t_0+1}, v_{t_0+2}, \ldots, v_{t_0+D}\}=\{v_{t_0+1,1}, v_{t_0+1,2}, \ldots, v_{t_0+D,n_{t_0+D}}\}$,
all possible visiting plans are $V=\text{Permutation}(v)=\{v_1, v_2, \ldots, v_{1_1}\}$,
the daily trip time is $\tau=\{\tau_{t_0+1}, \tau_{t_0+2}, \tau_{t_0+3}, \ldots, \tau_{t_0+D}\}$,
the daily AQI for visiting route v is $AQI_v^{visit}(t)$,
the daily trip distance for visiting route v and location h:

$$d_{v,h}^{trip}(t) = d_{h,v_{t,1}}^{trip} + \sum_{i=1}^{n_t-1} d_{v_{t,i},v_{t,i+1}}^{trip} + d_{v_{t,n_t},h}^{trip},$$

the daily visiting cost for visiting route v is $$c_v^{visit}(t) = \sum_{i=1}^{n_t} c_{v_{t,i}}^{visit},$$

the daily trip cost for visiting route v and location h are $$c_{v,h}^{trip}(t) = c_{h,v_{t,1}}^{trip} + \sum_{i=1}^{n_t-1} c_{v_{t,i},v_{t,i+1}}^{trip} + c_{v_{t,n_t},h}^{trip},$$

the visiting time of ith attraction for visiting route v is $a_v^{visit}(t,\tau_t,i)=\tau_{t,i}-\tau_{t,i-1}$,
the daily waiting time for visiting route v is $$a_v^{wait}(t, \tau_t) = \sum_{i=1}^{n_t} a_{v_{t,i}}^{wait}(t, \tau_{t,i}),$$

the daily trip time for visiting route v and location h is $$a_{v,h}^{trip}(t, \tau_t) = a_{h,v_{t,1}}^{trip}(t, \tau_{t,0}) + \sum_{i=1}^{n_t-1} a_{v_{t,i},v_{t,i+1}}^{trip}(t, \tau_{t,i}) + a_{v_{t,n_t},h}^{trip}(t, \tau_{t,n_t}).$$

Permutations V are compiled by searching the modified planning graph for chains of nodes and arcs that meet the user's trip objectives. Some choices within the permutations may be forced when the user objectives specify a certain requirement, such as visiting a certain place or attraction on a certain day or time. Then, the optimal trip plan is identified from the permutations using mixed integer programming which calculates an aggregate cost of each permutation and inspects each permutation to ensure that it satisfies the constraints as identified by the customized user preferences.

$$\text{Optimal Trip Plan: } \{h, v, \tau\}^* = \underset{\{h,v,\tau\}}{\text{Min}} \left\{ \sum_{t=t_0+1}^{t_0+D} [a_{v,h}^{trip}(t, \tau_t)] \right\}$$

$$\text{subject to } \begin{cases} \sum_{t=t_0+1}^{t_0+1} [c_v^{visit}(t) + c_{v,h}^{trip}(t)] \leq C^0, \text{ trip cost constraint} \\ AQI_v^{visit}(t) \geq AQI_v^0, \text{ AQI constraint} \\ a_i^{visit,0} \leq a_v^{visit}(t, \tau_t, i) \leq a_i^{visit,1}, \text{ visiting time constraint} \\ a^{wait}(t, \tau_t) \leq a^{wait,0}, \text{ waiting time constraint} \\ \tau_{t,0} \geq \tau^0, \text{ starting time constraint} \\ \tau_{t,n_t} \leq \tau^1, \text{ ending time constraint} \\ \tau_{t,0} \leq \tau_{t,1} \leq \tau_{t,2} \ldots \leq \tau_{t,n_t} \end{cases}$$

where $h \in h$, $v \in V$.

In addition to the very lowest (i.e., single minimum value) aggregate cost optimal trip, several of the next lowest optimal trips can also be identified and presented to the user as approximately equal visiting plans to provide the user with flexibility in making a final selection. Final trip selection can also be performed interactively. For example, an initial run may identify an optimal location to stay (e.g., hotel) for the trip, and then the user may re-specify the trip objectives/preferences to evaluate all visiting plans including that location.

Figure 6:
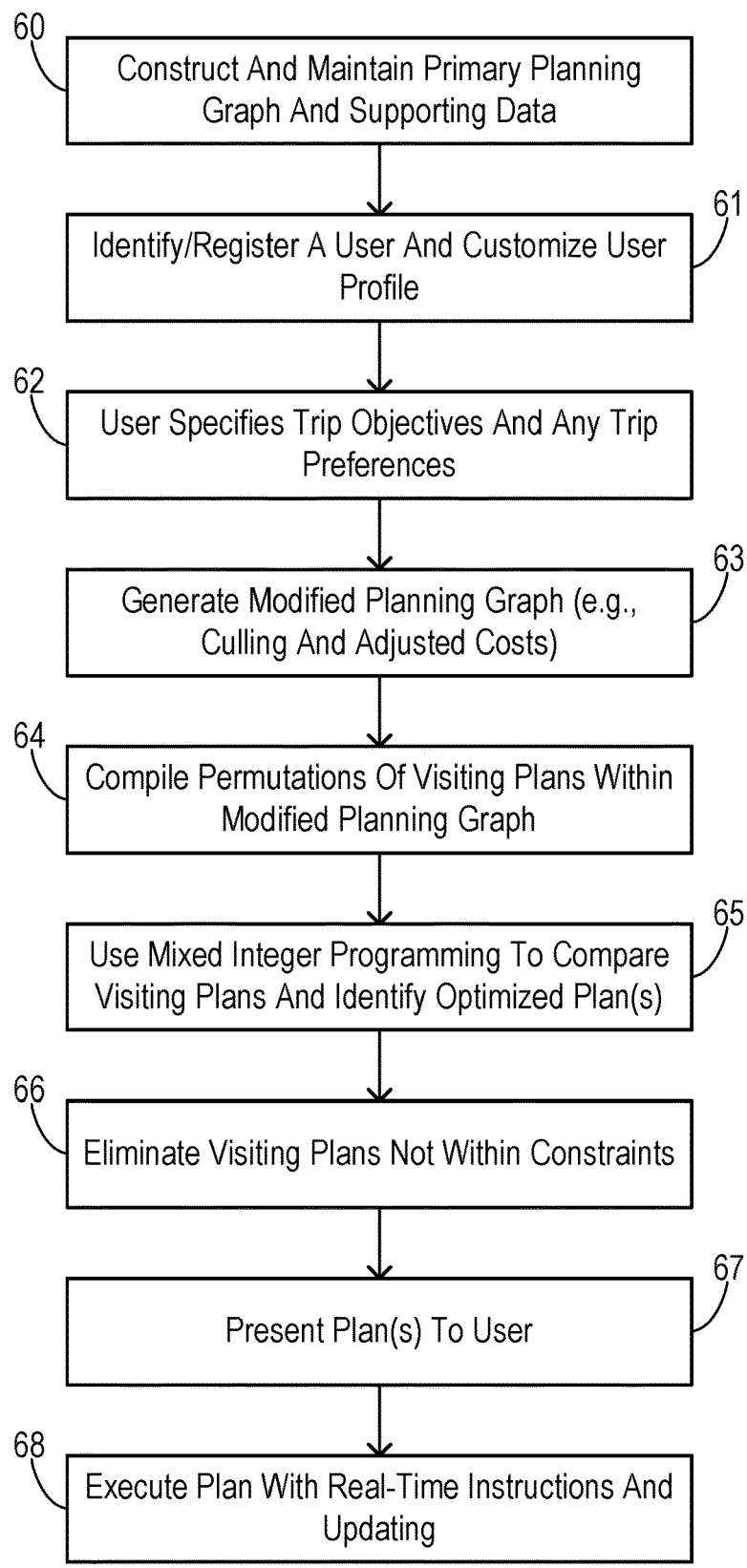
FIG. 6 is a flowchart showing one preferred method of the invention.

A preferred method of the invention is shown in FIG. 6. In step 60, a primary planning graph is constructed and supporting data is maintained. A user of the trip planning service is registered (or a previously registered user is identified) in step 61, and the user is given the opportunity to customize a user profile including trip preferences. In step 62, the user specifies trip objectives and any specific trip preferences. A modified planning graph is generated in step 63 such as by culling irrelevant nodes or arcs and/or by adjusting associated time-variable costs in order to encourage or discourage choices or nodes or arcs in accordance with the user's preferences.

In step 64, permutations of visiting plans within the modified planning graph that satisfy the trip objectives are compiled. In step 65, mixed integer programming is used to compare the aggregate costs of all the permutated visiting plans in order to identify optimized plans, and any visiting plans not within the user constraints are eliminated from consideration in step 66. In step 67, the identified plans are presented to the user. A selected plan is executed with real-time instructions in step 68. Traffic or real time public transportation data is fed into the system to modify the travel times by different transportation modes. Further updating or re-optimizing of a plan may be performed either automatically or in response to user request or real-time events, such as accidents or congestion, during plan execution.

Additional interactive services can be provided in connection with a selected visiting plan. For example, based on an optimized route choice and known user preferences for various services (such as parking preferences, preferred restaurants and coffee shops), the user could be presented with relevant coupons or other offers or could reserve the tickets or seats in connection with the services available along the chosen route.

Figure 7:
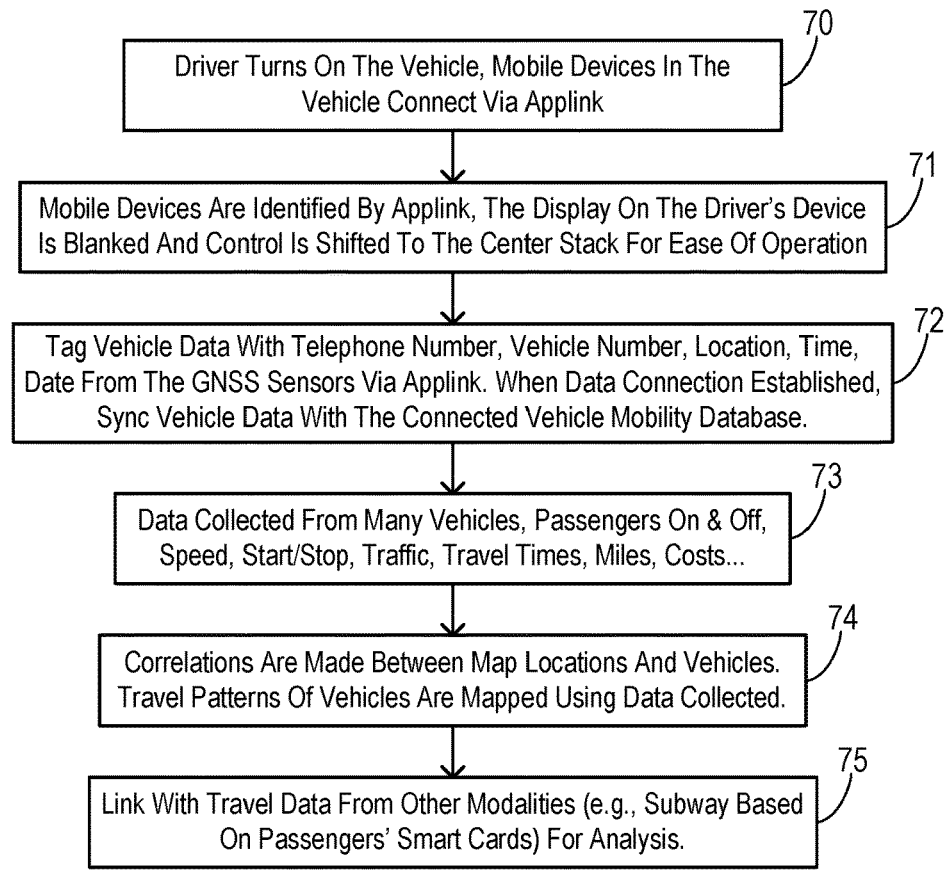
FIG. 7 is a flowchart showing a method of collecting travel-related data for monitoring and estimating costs associated with elements in a planning graph.

In addition to the pre-planning and real-time guidance during execution of selected visiting plans, the users with their app-enabled mobile devices may also provide a data source for collecting real time transportation data regarding usage and actual costs for nodes and arcs being traversed in order to help construct the primary planning graph. As shown in FIG. 7, for example, when a driver turns on their vehicle in step 78, mobile device having the TOP mobile app connects with an in-vehicle driver interface system or module (such as the Ford SYNC system). Once the mobile device is identified by an application link in the vehicle system in step 71, the display on the driver's mobile device is blanked and control for the trip optimal planner function is shifted to the in-vehicle system (which may be mounted on a vehicle center stack for ease of operation). In step 72, vehicle operation is monitored to measure various costs such as travel time, road congestion, and other factors as the user operates the vehicle to traverse nodes and arcs included in a primary planning graph being maintained by a TOP service provider. The vehicle data is tagged with telephone number, vehicle identification number, location, time, and date which can be obtained from position monitoring sensors on the vehicle or via the application link to the mobile device. When sufficient data has been collected and a data connection between the vehicle or mobile device and the cloud-based TOP service is available, then the vehicle data is synced with (i.e., transmitted to) a cloud-based mobility database used to construct the planning graph. As shown in step 73, similar data is collected from many vehicles according a variety of costs related parameters. By correlating map locations with the vehicle data in step 74, travel patterns for vehicles can be mapped to create real-time cost data which is then stored and aggregated with other existing data as updated historical data to be used to identify patterns of time variation in the respective cost factors.

In step 75, travel data may be linked from other transportation modes such as monitoring smartcards or other user devices that are active when the individual carrying the devices uses public transportation elements such as a subway. Data can be collected anonymously and then used to compile and refine cost information for all the modalities being utilized in a planning graph. Collected real-time data can also be compared with published timetable information for various modes of public transportation to estimate usage and determine reliability of published schedules, for example.

What is claimed is:

1. A multi-modal trip planning system, comprising:
a planning graph representing a plurality of nodes interconnected by a plurality of transit arcs, wherein the nodes include waypoints and trip destinations, wherein the transit arcs include alternate transportation modes, wherein the nodes and arcs have associated time-variable costs;
a user interface configured to specify a plurality of user objectives within the trip destinations and to customize a plurality of user preferences for a multi-modal trip, wherein the user objectives include a trip starting location, a trip ending location, and an attraction to be visited between the starting and ending locations, wherein the attraction to be visited is included in the nodes and has an associated constraint for optimization;
an optimizer coupled to the planning graph and the user interface configured to 1) modify the planning graph according to the user objectives and the customized user preferences, 2) compile a plurality of permutations of visiting plans within the modified planning graph which satisfy the specified user objectives including routing to a plurality of trip destinations including the attraction to be visited, and 3) comparing the permutations using an optimization programming to identify at least one optimized visiting plan having a lowest aggregate associated cost that also satisfies a plurality of constraints determined by the customizable user preferences and including the constraint associated with the attraction to be visited;
wherein the user interface presents at least one optimized visiting plan to a user.

2. The planning system of claim 1 wherein the optimization programming is comprised of mixed integer programming.

3. The planning system of claim 1 wherein the optimization programming is comprised of constraint programming.

4. The planning system of claim 1 wherein the lowest aggregated associated cost is comprised of a shortest travel time.

5. The planning system of claim 1 wherein the trip destinations in the planning graph include lodging, services, recreation attractions, business sites, and places to visit.

6. The planning system of claim 1 wherein the optimizer modifies the planning graph by adjusting associated time variable costs of the nodes and arcs.

7. The planning system of claim 1 wherein the optimizer modifies the planning graph by culling nodes and arcs unrelated to the specified user objectives.

8. The planning system of claim 1 wherein the specified user objectives include a date range, and wherein the attraction to be visited is comprised of at least one specific recreational attraction as a trip destination.

9. The planning system of claim 1 wherein the specified user objectives include a date range, and wherein the attraction to be visited is comprised of at least one type of recreational attraction as a trip destination.

10. The planning system of claim 1 wherein the user preferences include mode of transportation, services to be used, travel time, number of companions, type of accommodations, and monetary spending.

11. The planning system of claim 1 wherein the user preferences include air quality index, weather conditions, and crowding.

12. The planning system of claim 1 wherein at least some of the user preferences have a default value unless customized by the user.

13. The planning system of claim 1 wherein the optimizer compares the visiting plans according to:

$$\{h, v, \tau\}^* = \underset{\{h,v,\tau\}}{\text{Min}} \left\{ \sum_{t=t_0+1}^{t_0+D} [a_{v,h}^{trip}(t, \tau_t)] \right\}$$

subject to
$$\begin{cases} \sum_{t=t_0+1}^{t_0+I} [c_v^{visit}(t) + c_{v,h}^{trip}(t)] \leq C^0, \text{ trip cost constraint} \\ AQI_v^{visit}(t) \geq AQI_v^0, \text{ AQI constraint} \\ a_i^{visit,0} \leq a_v^{visit}(t, \tau_t, i) \leq a_i^{visit,1}, \text{ visiting time constraint} \\ a^{wait}(t, \tau_t) \leq a^{wait,0}, \text{ waiting time constraint} \\ \tau_{t,0} \geq \tau^0, \text{ starting time constraint} \\ \tau_{t,n_t} \leq \tau^1, \text{ ending time constraint} \\ \tau_{t,0} \leq \tau_{t,1} \leq \tau_{t,2} \ldots \leq \tau_{t,n_t} \end{cases}$$

where the location list is $h=\{h_1, h_2, \ldots, h_J\}$, the visiting dates are $t=\{t_0+1, t_0+2, \ldots, t_1+D\}$, the daily number of places visited are $n=\{n_{t_0+1}, n_{t_0+2}, \ldots, n_{t_0+D}\}$, the visiting routes are $v=\{v_{t_0+1}, v_{t_0+2}, \ldots, v_{t_0+D}\}=\{v_{t_0+1,1}, v_{t_0+1,2}, \ldots, v_{t_0+D,nt_0+D}\}$, all possible visiting plans are V=Permutation $(v)=\{v_1, v_2, \ldots, v_{1!}\}$, the daily trip time is $\tau=\{\tau_{t_0+1}, \tau_{t_0+2}, \tau_{t_0+3}, \ldots, \tau_{t_0+D}\}$, the daily AQI for visiting route v is $AQI_v^{visit}(t)$, the daily trip distance for visiting route v and location h:

$$d_{v,h}^{trip}(t) = d_{h,v_{t,1}}^{trip} + \sum_{i=1}^{n_t-1} d_{v_{t,i},v_{t,i+1}}^{trip} + d_{v_{t,n_t},h}^{trip},$$

the daily visiting cost for visiting route v is $$c_v^{visit}(t) = \sum_{i=1}^{n_t} c_{v_{t,i}}^{visit},$$

the daily trip cost for visiting route v and location h are $$c_{v,h}^{trip}(t) = c_{h,v_{t,1}}^{trip} + \sum_{i=1}^{n_t-1} c_{v_{t,i},v_{t,i+1}}^{trip} + c_{v_{t,n_t},h}^{trip},$$

the visiting time of ith attraction for visiting route v is $a_v^{visit}(t,\tau_t,i)=\tau_{t,i}-\tau_{t,i-1}$, the daily waiting time for visiting route v is $$a_v^{wait}(t, \tau_t) = \sum_{i=1}^{n_t-1} a_{v_{t,i}}^{wait}(t, \tau_{t,i}),$$

the daily trip time for visiting route v and location h is $$a_{v,h}^{trip}(t, \tau_t) = a_{h,v_{t,1}}^{trip}(t, \tau_{t,0}) + \sum_{i=1}^{n_t-1} a_{v_{t,i},v_{t,i+1}}^{trip}(t, \tau_{t,i}) + a_{v_{t,n_t},h}^{trip}(t, \tau_{t,n_t})$$

and h∈h, v∈V.

14. The planning system of claim 1 wherein the associated time-variable costs include future costs forecasted for different transportation modes using historical and current cost information.

15. The planning system of claim 1 wherein the planning graph and optimizer are comprised of a controller network including cloud-based computing resources.

16. The planning system of claim 15 wherein the user interface includes a mobile electronic controller wirelessly coupled to the controller network.

17. A method of planning a multi-modal trip, comprising the steps of:
representing a planning graph as a plurality of nodes interconnected by a plurality of transit arcs, wherein the nodes include waypoints and trip destinations, wherein the transit arcs include alternate transportation modes, wherein the nodes and arcs have associated time-variable costs;
specifying a plurality of user objectives within the trip destinations, wherein the user objectives include a trip starting location, a trip ending location, and an attraction to be visited between the starting and ending locations, wherein the attraction to be visited is included in the nodes and has an associated constraint for optimization;
customizing a plurality of user preferences for a multi-modal trip;
modifying the planning graph according to the user objectives and the customized user preferences;
compiling a plurality of permutations of visiting plans within the modified planning graph which satisfy the specified user objectives including routing to a plurality of trip destinations including the attraction to be visited;
comparing the permutations using optimization programming to identify at least one optimized visiting plan having a lowest aggregate associated cost that also satisfies a plurality of constraints determined by the customizable user preferences and including the constraint associated with the attraction to be visited; and
presenting at least one optimized visiting plan to a user.

18. The method of claim 17 wherein the trip destinations in the planning graph include lodging, services, and recreation attractions, and wherein the specified user objectives include a date range, and wherein the attraction to be visited is comprised of at least one specific recreational attraction as a trip destination.

19. The method of claim 17 wherein the step of modifying the planning graph is comprised of adjusting associated time variable costs of the nodes and arcs.

20. The method of claim 17 wherein the step of modifying the planning graph is comprised of culling nodes and arcs unrelated to the specified user objectives.

21. The method of claim 17 wherein the user preferences include mode of transportation, services to be used, travel time, type of accommodations, and monetary spending.

22. The method of claim 17 wherein at least some of the user preferences have a default value unless customized by the user.

23. The method of claim 17 wherein the comparing step uses optimization programming to identify an optimized visiting plan according to:

$$\{h, v, \tau\}^* = \underset{[h,v,\tau]}{\text{Min}} \left\{ \sum_{t=t_0+1}^{t_0+D} [a_{v,h}^{trip}(t, \tau_t)] \right\}$$

subject to
$$\begin{cases} \sum_{t=t_0+1}^{t_0+1} [c_v^{visit}(t) + c_{v,h}^{trip}(t)] \leq C^0, \text{ trip cost constaint} \\ AQI_v^{visit}(t) \geq AQI_v^0, \text{ AQI constraint} \\ a_i^{visit,0} \leq a_v^{visit}(t, \tau_t, i) \leq a_i^{visit,1}, \text{ visiting time constraint} \\ a^{wait}(t, \tau_t) \leq a^{wait,0}, \text{ waiting time constraint} \\ \tau_{t,0} \geq \tau^0, \text{ starting time constraint} \\ \tau_{t,n_t} \leq \tau^1, \text{ ending time constraint} \\ \tau_{t,0} \leq \tau_{t,1} \leq \tau_{t,2} \ldots \leq \tau_{t,n_t} \end{cases}$$

where
the location list is $h=\{h_1, h_2, \ldots, h_J\}$,
the visiting dates are $t=\{t_0+1, t_0+2, \ldots, t_1+D\}$,
the daily number of places visited are $n=\{n_{t_0+1}, n_{t_0+2}, \ldots, n_{t_0+D}\}$,
the visiting routes are $v=\{v_{t_0+1}, v_{t_0+2}, \ldots, v_{t_0+D}\}=\{v_{t_0+1,1}, v_{t_0+1,2}, \ldots, v_{t_0+D,nt_0+D}\}$,
all possible visiting plans are V=Permutation $(v)=\{v_1, v_2, \ldots, v_{J!}\}$,
the daily trip time is $\tau=\{\tau_{t_0+1}, \tau_{t_0+2}, \tau_{t_0+3}, \ldots, \tau_{t_0+D}\}$,
the daily AQI for visiting route v is $AQI_v^{visit}(t)$,
the daily trip distance for visiting route v and location h:

$$d_{v,h}^{trip}(t) = d_{h,v_{t,1}}^{trip} + \sum_{i=1}^{n_t-1} d_{v_{t,i},v_{t,i+1}}^{trip} + d_{v_{t,n_t},h}^{trip},$$

the daily visiting cost for visiting route v is $$c_v^{visit}(t) = \sum_{i=1}^{n_t} c_{v_{t,i}}^{visit},$$

the daily trip cost for visiting route v and location h are $$c_{v,h}^{trip}(t) = c_{h,v_{t,1}}^{trip} + \sum_{i=1}^{n_t-1} c_{v_{t,i},v_{t,i+1}}^{trip} + c_{v_{t,n_t},h}^{trip},$$

the visiting time of ith attraction for visiting route v is $a_v^{visit}(t,\tau_t,i)=\tau_{t,i}-\tau_{t,i-1}$,
the daily waiting time for visiting route v is $$a_v^{wait}(t, \tau_t) = \sum_{i=1}^{n_t} a_{v_{t,i}}^{wait}(t, \tau_{t,i}),$$

the daily trip time for visiting route v and location h is $$a_{v,h}^{trip}(t, \tau_t) = a_{h,v_{t,1}}^{trip}(t, \tau_{t,0}) + \sum_{i=1}^{n_t-1} a_{v_{t,i},v_{t,i+1}}^{trip}(t, \tau_{t,i}) + a_{v_{t,n_t},h}^{trip}(t, \tau_{t,n_t})$$

and $h \in h$, $v \in V$.

* * * * *